United States Patent
Yavitch

[15] 3,669,171
[45] June 13, 1972

[54] FASTENER ASSEMBLY

[72] Inventor: Morris Yavitch, 1008 Benedict Canyon Drive, Beverly Hills, Calif. 90210

[22] Filed: June 8, 1970

[21] Appl. No.: 44,137

[52] U.S. Cl. .................................151/44, 4/252 R, 85/53
[51] Int. Cl. ........................................A47g 3/00, F16b 39/02
[58] Field of Search.....................151/44, 60, 54, 53, 68, 33, 151/37, 38; 85/53, 55, 56, 50, 35; 4/252 R, 236; 248/361

[56] References Cited

UNITED STATES PATENTS

| 1,228,679 | 6/1917 | Jones | 151/53 |
| 1,528,777 | 3/1925 | Marting | 151/44 UX |
| 3,176,747 | 4/1965 | Nenzell | 85/50 R X |
| 2,653,835 | 9/1953 | Nelson | 85/56 X |
| 2,819,642 | 1/1958 | Refrigeri | 85/53 |
| 2,312,183 | 2/1943 | Murfin | 85/53 X |
| 2,498,221 | 2/1950 | Poupitch | 151/38 X |

FOREIGN PATENTS OR APPLICATIONS

| 661,354 | 7/1965 | Belgium | 85/53 |
| 27,703 | 3/1964 | Germany | 85/53 |

*Primary Examiner*—Ramon S. Britts
*Attorney*—Lindenberg, Freilich & Wasserman

[57] ABSTRACT

Apparatus for use with a bolt and nut to hold down a water closet to a flanged member with a slot therein, which is economical to produce and install. The fastener assembly includes a sheet metal member with a center portion bent into a U-shape for reception in said slot to resist turning, a hole in the center for receiving the shank of the bolt so it can project through the slot and through the water closet, and turned-over ends for engaging the bolt head to prevent it from turning. The assembly also includes a cap with an upper washer-like portion through which the bolt shank can project and flared side walls whose lower end can rest on the water closet, and a cover with tapered inner walls for snugly engaging the side walls of the cap.

5 Claims, 6 Drawing Figures

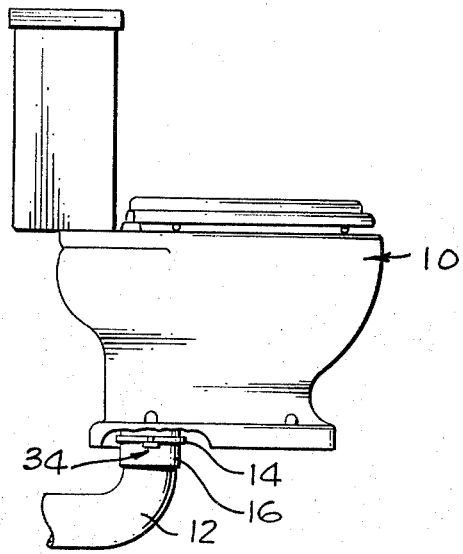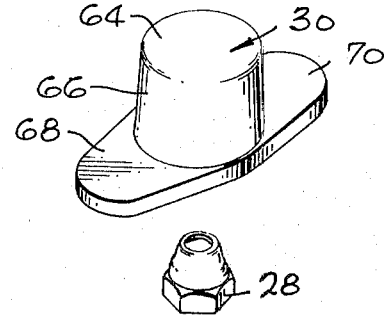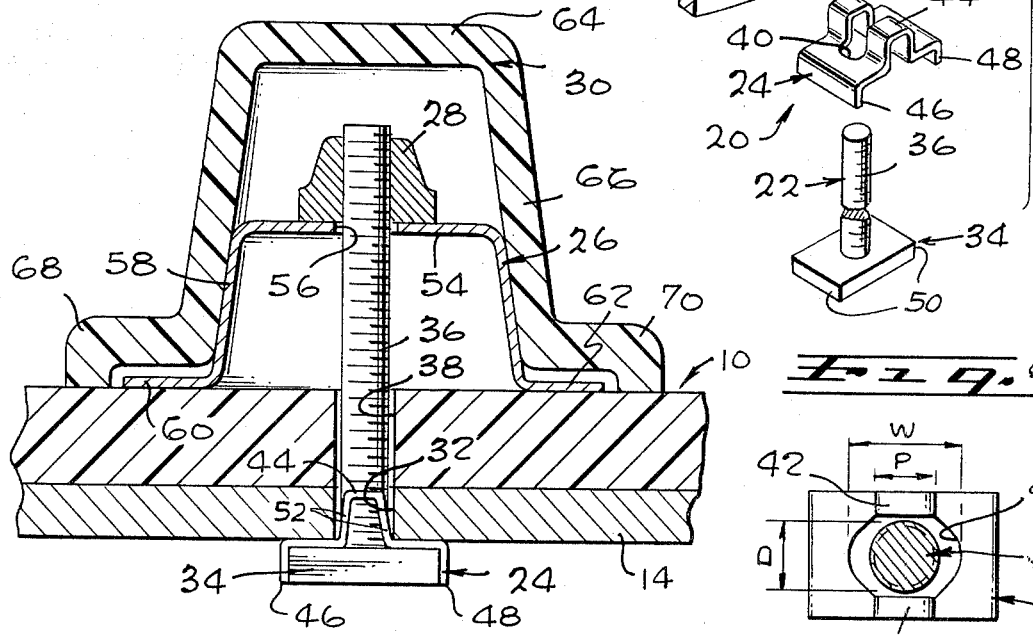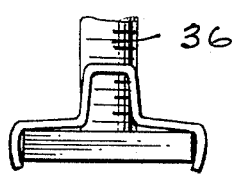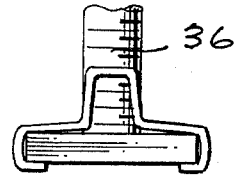

3,669,171

FASTENER ASSEMBLY

BACKGROUND OF THE INVENTION

1. Field of the Invention

This invention relates to fasteners and, while not limited thereby, relates especially to fastening devices for holding down a water closet.

2. Description of the Prior Art

A water closet is usually held down to a flange at the end of a sewer line by a bolt that extends upwardly through a slot in the flange and through a hole in the water closet. The head of the bolt is generally hidden when a nut is screwed onto its upper end to hold down the water closet, so provisions must be made to prevent the bolt from turning. One method which has been resorted to is to form protrusions on the head of the bolt that are received in the flange slot to prevent turning. However, the protrusions often must be added by welding or the like to an ordinary bolt because it is difficult to utilize high speed bolt forming machines to form such protrusions. Of course, this substantially increases the price of the bolts.

After the nut is screwed down to secure the water closet in place, the upper end of the bolt and the nut must be hidden by an attractive cover that blends with the color of the water closet. Such covers have often been installed using adhesives to hold them in place. However, the application of adhesives involves additional time and annoyance. A fastening assembly which was economical to produce and easy to rapidly install would reduce the cost of installing water closets.

OBJECTS AND SUMMARY OF THE INVENTION

An object of the present invention is to provide apparatus for preventing rotation of a bolt that extends through a slot.

Another object is to provide an economical and easily installed cover assembly for use on a water closet to hide the nut that holds down the closet.

In accordance with one embodiment of the present invention, an economical fastener assembly is provided which enables an ordinary bolt to be used in holding down a water closet and which enables the nut and upper end of the bolt to be easily and attractively covered. The assembly includes a turn-resisting member constructed of sheet metal, with a center portion bent into a U-shape for reception in the slot of the sewer flange to resist turning. The turn-resisting member has a hole in the center of its U portion for receiving the shank of the bolt, and has turned-over ends for engaging the sides of the bolt head to prevent it from turning. The turn-resisting member can be installed on an ordinary bolt, and it and the bolt can be economically produced.

The shank of the bolt normally protrudes above the water closet, and the water closet is held down by screwing down a nut. The fastener assembly of this invention includes a cup-shaped cap with an upper washer portion having a hole through which the threaded bolt can project and flared side walls whose lower end rests on the water closet. After the bolt shank passes through the cap, a nut is screwed on it to hold down the cap which holds down the water closet. The fastening apparatus is concealed by a cover with tapered inner walls that snugly engage the side walls of the cap to resist accidental removal. The bottom of the cap has outwardly extending flanges, while the cover has recesses that closely receive the flanges to resist turning of the cover. The cover has a round upper portion and oval bottom portion to provide a round appearance which is often considered attractive, while also providing an oval form at the bottom for covering any slot that may be present in the water closet.

The novel features of the invention are set forth with particularity in the appended claims. The invention will be best understood from the following description when read in conjunction with the accompanying drawings.

BRIEF DESCRIPTION OF THE DRAWINGS

FIG. 1 is a side elevation view of a water closet installation, showing the manner in which the fastener assembly may be utilized;

FIG. 2 is an exploded perspective view of the fastener assembly showing the manner in which it can hold down a water closet;

FIG. 3 is a side sectional view of the fastener assembly of FIG. 2;

FIG. 4 is a plan view of a bolt and the turn-resisting member of FIG. 2;

FIG. 5 is a side elevation view of a turn-resisting member constructed in accordance with another embodiment of the invention, shown installed on a bolt; and FIG. 6 is a side elevation view of still another embodiment of a turn-resisting member, shown installed on a bolt.

DESCRIPTION OF THE PREFERRED EMBODIMENTS

FIG. 1 illustrates a water closet 10 which is coupled to a sewer pipe 12 and held down to the flange 14 at the end of a pipe fitting 16. As shown in FIGS. 2–4, a fastener assembly 20 which holds down the water closet includes a bolt 22, a turn-resisting member 24, a cap 26, a nut 28, and a cover 30. The turn-resisting member 24 serves to prevent rotation of the bolt relative to a slot 32 in the flange through which the bolt extends. The cover 30 serves to conceal the upper end of the bolt 22 and the nut 28 that fits over it, while the cap 26 serves to receive the cover 30 and hold it in place.

The bolt 22 has a rectangular head 34 that normally lies beneath the flange 14 of the pipe fitting, and a long threaded shank 36 that extends upwardly therefrom. The shank 36 extends through the elongated hole or slot 32 in the flange and a hole 38 in the water closet, and its upper end is designed to threadably engage the nut 28. In the absence of the turn-resisting member 24, the bolt 22 could readily turn in the holes and hamper the turning of the nut 28 thereon. The turn-resisting member prevents such turning without the necessity for welding or otherwise applying protuberances to the head of the bolt to engage the walls of the flange slot 32.

The turn-resisting member 24 is constructed of a rectangular piece of sheet metal with an elongated aperture 40 therein. A center portion of the member is bent into a substantially U shape, the hole 40 dividing the center into two U-shaped portions 42, 44 on either side of the hole. The opposite ends 46, 48 of the sheet metal member are turned over to extend in a direction opposite to the U-shaped center portion, to closely engage the straight edges 50 on opposite sides of the bolt head. The U-shaped center portions 42, 44 are slightly smaller than the width of the flange slot 32, to permit them to be received therein and prevent turning of the member 24 with respect to the flange. As illustrated in the drawings, the legs 52 of the U-shaped center portion extend largely perpendicular to adjacent regions of the turn-resisting member, that is, the legs are defined along most of their lengths by substantially planar surfaces that extend with majority directional components along an imaginary axis which extends perpendicular to the length of the turn-resisting member. When the shank of the bolt projects through the hole 40 in the turn-resisting member and its head is engaged by the turned-over ends 46, 48, the bolt cannot turn with respect to the member 24. Therefore, the bolt cannot turn with respect to the walls of the slot 32 in the flange. The turn-resisting member 24 can be formed from sheet metal in low cost operations, so that the combined cost of the member 24 and an ordinary bolt 22 is substantially less than the cost of a specially made bolt with projections welded thereon for preventing its rotation relative to the slot.

It may be noted in FIG. 4 that the hole 40 in the turn-resisting member has a width W which is greater than the diameter D of the bolt shank, and greater than the width P of the U-shaped portion between the outer surfaces of the legs thereof. This enables the U-shaped portions 42, 44 to be approximately as narrow or even narrower than the bolt, so that the U-shaped portions can be received in a slot having a width approximately equal to the diameter D of the bolt. This is important because in many cases it is desirable to use a bolt with a diameter D approximately equal to the width of the flange slot 32 through which the bolt must project. If the outer surfaces of the legs 52 of the U-shaped portion were separated by a distance substantially greater than the diameter D of the bolt shank, then the U-shaped portion could not fit into a narrow slot which was only as wide as the bolt shank. However, by making the hole 40 in the turn-resisting member wider than the distance P between the outer sides of the U-shaped portion, the legs 52 of the U-shaped portion can be squeezed together to fit into a narrower slot. The turn-resisting member can be formed with the U-shaped portion slightly wider than the flange slot, so that the legs of the U-shaped portion must spring together slightly to fit into the slot. The turn-resisting member then will not readily fall out of the slot. As shown in FIG. 4, the width P of the U-shaped portion is about equal to the diameter A of a bolt that can be closely received in the hole 40, that is, a bolt whose diameter A extends across a majority of the smallest hole dimension. The bolt 22 can be formed with a hole in it slightly above the head to receive a pin that can hold it in place on the flange. Such a hole can also be formed at the top of U-shaped portions of the turn-resisting member.

The cap 26 which lies under the nut 28 includes an upper washer-like portion 54 with a hole 56 through which the bolt shank extends, and side walls 58 which depend from the periphery of the washer portion. The side walls 58 have lower ends that rest on the water closet 10, and have tabs 60, 62 that extend outwardly from the lower ends. The cover 30 has a round top 64 and almost cylindrical side walls 66 depending from the top. The lower end of the cover has an almost oval shape, with extending portions 68, 70 that rest on the water closet and which have recesses that can receive the tabs 60, 62 of the cap.

The inner diameter of the side wall 68 of the cover are of a size to snugly fit the side walls of the cap 58. Accordingly, once the cap is installed, the cover 30 can be installed by merely pressing it over the cap, so it is held by frictional forces thereon. The recesses in the extending portions 68, 70 are approximately as wide as the tabs 60, 62 of the cap which they receive, to resist turning of the cover. The cap 26 is installed by resting it on the water closet with the upper end of the bolt shank 36 extending through its hole 56, and then screwing on the nut 28 to firmly hold down the cap and therefore hold down the water closet. The cover 30 is then installed by merely pushing it down into place on the cap. The cover 30 is tall enough to receive the protruding portion of the bolt shank. The side walls 58 of the cap and side walls 66 of the cover can be flared outwardly at a slight angle to facilitate a snug fit.

The water closet can be installed by laying it on the flange 14 of the sewer pipe fitting, slipping the turn-resisting member 24 onto the bolt and projecting the bolt through the flange and water closet with the member 24 received in the flange slot 32. The cap 26 is then layed on the water closet with the bolt projecting through it, and the nut 28 is screwed down to hold down the cap. The cover 30 is then installed by pressing it down over the cap. As mentioned above, the bolt and turn-resisting member 24 can be produced economically. The cap 26 also can be produced economically out of sheet metal, while the cover 30 can be produced economically by molding of plastic, ceramic, or the like. A plastic, ceramic or other material with a surface that can blend into the surface of a vitreous clay water closet is required. The fact that the cover 30 can be installed without the necessity for complex internal shapes or for metal parts molded into it, enables the cover to be produced at low cost by simple molding processes. The shape of the cover 30, combining a round upper portion and substantially oval lower portion enables it to be used where either round or oval covers are called for.

Thus, the invention provides fastening apparatus which is economical to produce, and which is especially useful in the installation of water closets, although it can be utilized in a variety of other applications. The apparatus includes a turn-resisting member with a U-shaped center portion for receipt in a slot, a hole for receiving a bolt, and turned-over edges for engaging the bolt head, to prevent rotation of the bolt with respect to the slot. The apparatus also includes a cap that can be held down by a bolt and which can snugly receive a decorative cover.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Fastener apparatus comprising:
   a cover having a hollow upper portion and a pair of laterally extending portions at the bottom-most part of the cover for resting on a surface, each of said laterally extending portions having a tab-receiving recess in said bottom-most part; and
   a cap having an upper portion with a non-threaded hole for readily passing the shank of a bolt therethrough, a substantially cylindrical lower portion dimensioned for snugly receiving said cover to retain it, and a pair of tabs extending outwardly from said lower portion for reception in said recesses of said laterally extending portions of said cover.

2. Fastening apparatus for preventing a bolt-like member with a head and shank from turning in a preformed slot through which it projects, comprising:
   a turn-resisting member having a length defining opposite ends and a center portion, and having an axis which extends perpendicular to the length, said member having a width at said center portion, and a thickness smaller than said width and length, said center portion being bent into a U-shape across the entire width thereat, the legs of the U-shaped portion being defined along most of their lengths by substantially planer surfaces that extend with majority directional components which are along said axis, said U-shaped portion having a non-threaded hole for readily passing the shank of a bolt therethrough, and at least one of said ends of said member having means to engage the bolt head to resist turning of the bolt with respect to said turn-resisting member.

3. The fastening apparatus described in claim 2 wherein:
   the legs of said U-shaped portion are spaced apart by a distance P to be closely received in a slot of predetermined width;
   said hole has a dimension, as measured along the width of said member, which is approximately equal to the distance P at which said legs of said U-shaped portion are spaced apart, so that a bolt can be closely received in said hole has a diameter about as large as the distance P; and
   said hole has a dimension W as measured in a direction parallel to the length of said member, which is greater than the distance P at which said legs of U-shaped portion are spaced apart.

4. The fastening apparatus described in claim 2 wherein:
   the height of the U-shaped portion is approximately equal to the smallest dimension of said hole.

5. Fastening apparatus for preventing a bolt-like member with a head and shank from turning in a preformed slot through which it projects, comprising:
   a turn-resisting member with a center portion bent into a substantially U-shape throughout the width of said turn-resisting member for reception in said slot to resist turning with respect to the walls of said slot, a non-threaded hole in said center portion for readily passing the shank of said bolt therethrough so it can project through said slot, and at least one end portion turned over to engage the edge of the bolt head to resist turning of the bolt with respect to said turn-resisting member;
   said U-shaped center portion being readily deformable so that said turn-resisting member can be received in a slot that is narrower than the original distance between the legs of the U-shaped portion by squeezing the legs of the U-shaped portion together.

* * * * *